United States Patent
Matsumoto et al.

(10) Patent No.: US 10,322,455 B2
(45) Date of Patent: Jun. 18, 2019

(54) ENGAGEMENT COMPONENT, FEMALE MEMBER, AND TOOL REPLACEMENT APPARATUS

(71) Applicant: NITTA CORPORATION, Osaka-shi, Osaka (JP)

(72) Inventors: Ryosuke Matsumoto, Yamatokoriyama (JP); Nobuhiro Omote, Yamatokoriyama (JP)

(73) Assignee: NITTA CORPORATION, Osaka (JP)

(*) Notice: Subject to any disclaimer, the term of this patent is extended or adjusted under 35 U.S.C. 154(b) by 0 days.

(21) Appl. No.: 15/538,643

(22) PCT Filed: Dec. 9, 2015

(86) PCT No.: PCT/JP2015/084530
§ 371 (c)(1),
(2) Date: Jun. 21, 2017

(87) PCT Pub. No.: WO2016/104149
PCT Pub. Date: Jun. 30, 2016

(65) Prior Publication Data
US 2017/0355049 A1    Dec. 14, 2017

(30) Foreign Application Priority Data
Dec. 26, 2014    (JP) .................................. 2014-264304

(51) Int. Cl.
*B23B 31/18*    (2006.01)
*B25J 15/04*    (2006.01)
(Continued)

(52) U.S. Cl.
CPC ............ *B23B 31/103* (2013.01); *B23B 31/18* (2013.01); *B25J 15/0425* (2013.01);
(Continued)

(58) Field of Classification Search
CPC ... B23B 31/103; B23B 31/18; B23B 2231/40; B25J 15/0425; Y10T 279/1041;
(Continued)

(56) References Cited

U.S. PATENT DOCUMENTS 6,375,378 B1    4/2002  Kitaura
7,328,924 B2 *  2/2008  Moilanen .............. B25B 1/2421
                                                        269/266
(Continued)

FOREIGN PATENT DOCUMENTS

JP    U1993-002887    1/1993
JP    H07-186079      7/1995
(Continued)

OTHER PUBLICATIONS

International Search Report dated Mar. 15, 2016 in International Application No. PCT/JP2015/084530.

*Primary Examiner* — Eric A Gates
(74) *Attorney, Agent, or Firm* — Wentsler LLC

(57) ABSTRACT

An engaging member, a female member and a tool changer that can be downsized are provided, and the engaging member is an engaging member including: an engaging surface that allows a cam provided in a male member to engage therewith; and a dispersing surface that transmits a force provided from the cam via the engaging surface, to a female member body, wherein the dispersing surface includes a first dispersing surface and a second dispersing surface perpendicular to each other, and a cross-sectional shape perpendicular to a longitudinal direction is formed in a substantially triangular shape by the dispersing surface and the engaging surface.

5 Claims, 14 Drawing Sheets

(51) Int. Cl.
*B23B 31/103* (2006.01)
*B23Q 3/155* (2006.01)

(52) U.S. Cl.
CPC .......... *B23B 2231/40* (2013.01); *B23Q 3/155* (2013.01); *Y10T 279/1045* (2015.01); *Y10T 279/1095* (2015.01); *Y10T 279/17231* (2015.01)

(58) Field of Classification Search
CPC ......... Y10T 279/1045; Y10T 279/1095; Y10T 279/17231
See application file for complete search history.

(56) References Cited

U.S. PATENT DOCUMENTS

| | | | | |
|---|---|---|---|---|
| 7,770,900 | B2 * | 8/2010 | Bechteler | B23B 31/36 279/2.09 |
| 8,005,570 | B2 * | 8/2011 | Gloden | B23B 31/1071 403/31 |
| 8,209,840 | B2 * | 7/2012 | Norton | B23B 31/1071 279/134 |
| 2016/0236357 | A1 * | 8/2016 | Kalb | B25J 17/02 |

FOREIGN PATENT DOCUMENTS

| | | |
|---|---|---|
| JP | 2012-213847 | 11/2012 |
| JP | 2012-250327 | 12/2012 |
| WO | 00/27596 | 5/2000 |

* cited by examiner

ENGAGEMENT COMPONENT, FEMALE MEMBER, AND TOOL REPLACEMENT APPARATUS

TECHNICAL FIELD

The present invention relates to an engaging member, a female member and a tool changer and specifically relates to those employed for an industrial robot.

BACKGROUND ART

As tool changers to be employed for various apparatuses, for example, industrial robots, those including a male member to be attached to the robot side and a female member to be attached to the tool side are disclosed (for example, Patent Literature 1). In a male member body of the male member, a projection portion and a cam that can project radially from the projection portion are provided. In a female member body of the female member, a coupling hole to which the projection portion can be inserted is formed, and in an inner peripheral surface of the coupling hole, an engaging member with which the cam can be engaged is provided. In the tool changers, upon the cam being engaged with the engaging member in a state in which the projection portion is inserted in the coupling hole, the male member and the female member are coupled. Also, disengagement between the cam and the engaging member enables decoupling between, the male member and the female member. In such a manner as above, a tool changer enables change of tools attached to an industrial robot.

In the case of Patent Literature 1 mentioned above, the engaging member includes a dispersing surface that can disperse power received from the cam, which allows the male member and the female member to be coupled by a non-biased, substantially uniform force.

CITATION LIST

Patent Literature

Patent Literature 1: Japanese Patent Laid-Open No. 2012-250327

SUMMARY OF INVENTION

Technical Problem

However, in the case of Patent Literature 1 above, a moment is generated in the engaging member by the force received from the cam. In order to suppress displacement of the engaging member by the moment, it is necessary to tightly fix the engaging member to the female member body via a plurality of bolts arranged radially in the female member. Then, the engaging member cannot be downsized, and as a result, there is a problem in that the female member and the tool changer inevitably have a large size.

An object of the present invention is to provide an engaging member, a female member and a tool changer that can be downsized.

Solution to Problem

An engaging member according to the present invention is an engaging member of a tool changer including a male member to be detachably attached to a body side of an apparatus and a female member to be detachably attached to a tool side, the engaging member being detachably attached to a female member body included in the female member, the engaging member including: an engaging surface that allows a cam provided in the male member to engage therewith; and a dispersing surface that transmits a force provided from the cam via the engaging surface, to the female member body, wherein the dispersing surface includes a first dispersing surface and a second dispersing surface that are substantially perpendicular to each other, and a cross-sectional shape perpendicular to the longitudinal direction is formed in a substantially triangular shape by the first dispersing surface, the second dispersing surface and the engaging surface.

A female member according to the present invention includes the engaging member detachably attached thereto.

A tool changer according to the present invention includes the female member.

Advantageous Effect of Invention

According to the present invention, a cross-sectional shape perpendicular to a longitudinal direction of an engaging member can be formed so as to be a substantially triangular shape by an engaging surface, and a first dispersing surface and a second dispersing surface, and thus the engaging member can be downsized. Therefore, the female member and the tool changer can be downsized as a whole.

BRIEF DESCRIPTION OF DRAWINGS

FIG. 2A is a diagram of a male member and FIG. 2B is a diagram of a female member;

FIG. 4A is a back view, FIG. 4B is a plan view, FIG. 4C is a front view and FIG. 4D is a right side view;

DESCRIPTION OF EMBODIMENT

An embodiment of the present invention will be described in detail below with reference to the drawings.

(1) Overall Configuration

Figure 1:
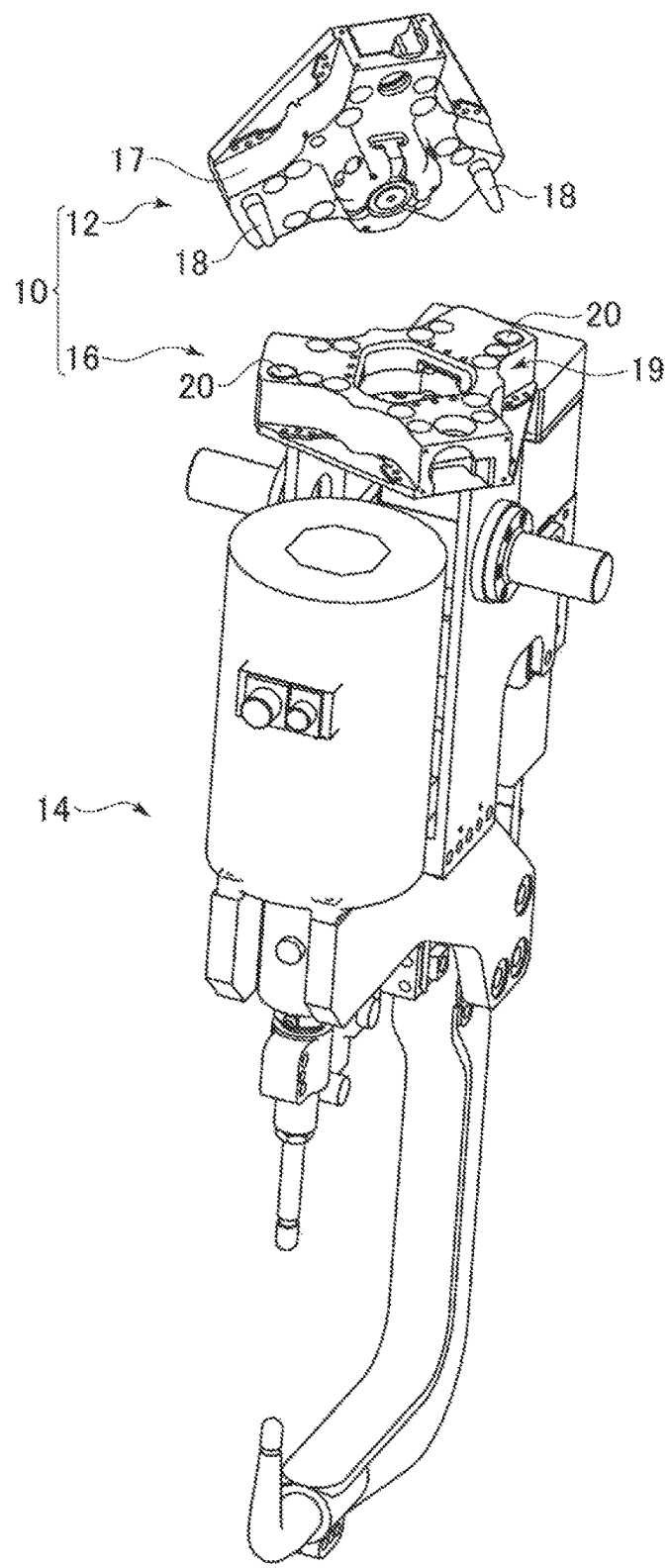
FIG. 1 is a perspective diagram illustrating a state of use of a tool changer according to the present embodiment.

A tool changer 10, which is illustrated in FIG. 1, includes a male member 12 fixed to a distal end of an arm (not illustrated), which is a body of an industrial robot, and a female member 16 fixed to a tool 14. The male member 12 is accurately positioned relative to the female member 16 by inserting positioning pins 18 provided at a male member body 17 into positioning holes 20 formed in a female member body 19 of the female member 16. Although the tool 14 is not specifically limited, a spot welding gun is illustrated in the figure. The male member 12 and the body are detachably fastened by a non-illustrated fastening tool, for example, a bolt, and the female member 16 and the tool 14 are detachably fastened by a non-illustrated fastening tool, for example, a bolt. The body and the tool 14 can be coupled and decoupled via the tool changer 10.

Figure 2A:
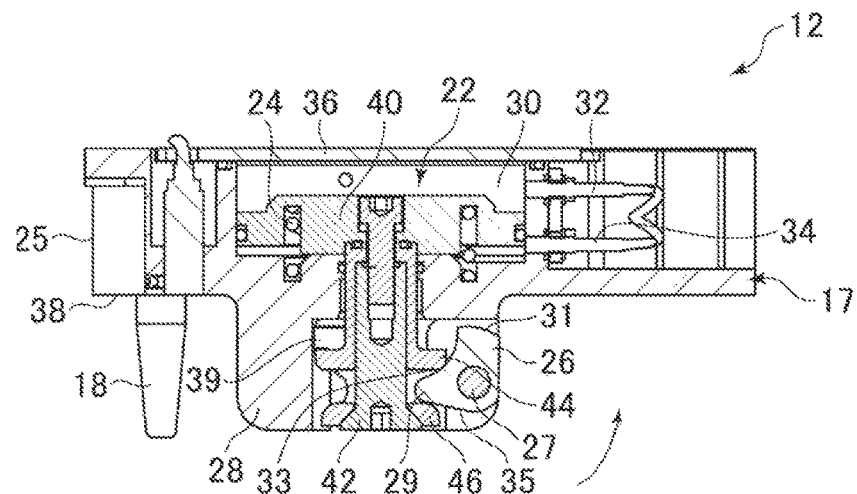
FIGS. 2A and 2B are cross-sectional views of the tool changer according to the present embodiment.

As illustrated in FIG. 2A, the male member 12 includes the male member body 17, and a cylinder 22, a coil spring 24 and cams 26 provided in the male member body 17. The coil spring 24 is fitted so as to be able to push the cylinder 22 up in one direction. The cylinder 22 linearly moves in the one direction and another direction (hereinafter referred to as axial direction or axially) to cause the cams 26 to rotate.

In the male member body 17, a plate-shaped portion 25 formed in a substantially plate shape, a projection portion 28 that projects from one surface of the plate-shaped portion 25, a cylinder chamber 30 formed inside the plate-shaped portion 25, and a cam mechanism receiving chamber 39 formed, inside the projection portion 28 coaxially with the cylinder chamber 30. The cylinder chamber 30 is formed by occluding a hole formed in another surface of the plate-shaped portion 25 by a flange 36. A first port 32 and a second port 34, which are axially aligned, are connected to the cylinder chamber 30. The first port 32 and the second port 34 are each connected to a gas supply/exhaust mechanism via a non-illustrated, piping. In the one surface of the plate-shaped portion 25, a male-member contact surface 38 is formed at a peripheral edge of the projection portion 28.

The cylinder 22 includes a head 40 arranged inside the cylinder chamber 30, a piston 42 provided on a center axis of the head 40, and a first diameter-increased portion 44 and a second diameter-increased portion 46 each formed on the distal end side of the piston 42. The head 40 is formed so as to slide axially inside the cylinder chamber 30. The first port 32 and the second port 34 are connected to one side and another side in the axial direction of the cylinder chamber 30 across the head 40. The piston 42 includes a proximal end coupled to the head 40 and a distal end arranged in the cam mechanism receiving chamber 39. At the distal end of the piston 42, the first diameter-increased portion 44 and the second diameter-increased portion 46 are provided so as to be spaced axially from each other. The first diameter-increased portion 44 and the second diameter-increased portion 46 each have a substantially discoid shape formed by extending the piston 42 radially.

Each cam 26, which is formed by a reversed-L shape member, is rotatably supported by the projection portion 28 of the male member body 17 via a relevant support shaft 27, and includes an addition portion 29 formed on one end side and an acting portion 31 formed on another end side. In the addition portion 29, a curved recess surface 33 and a flat surface 35 are formed on one side and another side, respectively, across the one end of the cam 26. The acting portion 31 is formed in a circular arc shape. The addition portion 29 is inserted between the first diameter-increased portion 4.4 and the second diameter-increased portion 46 with the recess surface 33 on the first diameter-increased portion 44 side and the flat surface 35 on the second diameter-increased portion 46 side. The cam 26 rotates around the support shaft 27 as a result of linear movement of the piston 42 causing the first diameter-increased portion 44 to push the recess surface 33 down or the second diameter-increased portion 46 to push the flat surface 35 up. On a circumference of the projection portion 28, a plurality of cams 26, in the case of the present embodiment, three cams 26, are provided at equal intervals.

Figure 2B:
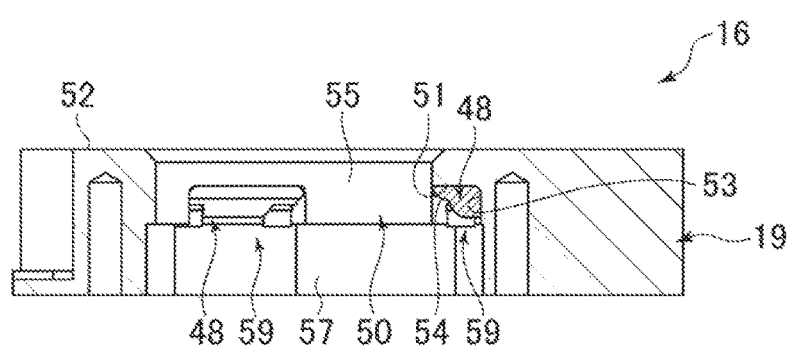
Figure 3:
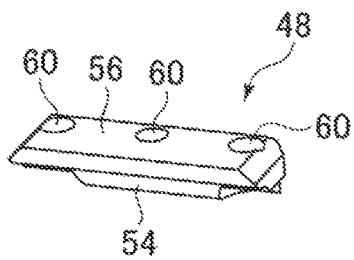
FIG. 3 is a perspective diagram illustrating a configuration of an engaging member according to the present, embodiment.
Figure 4A:
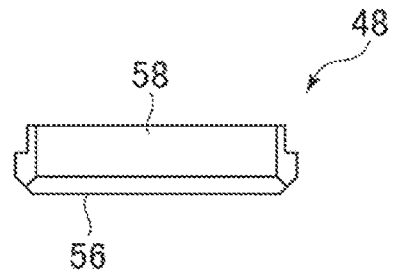
FIGS. 4A to 4D are diagrams illustrating the configuration of the engaging member according to the present embodiment.
Figure 4B:
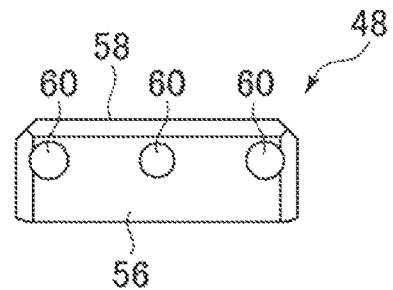
Figure 4C:
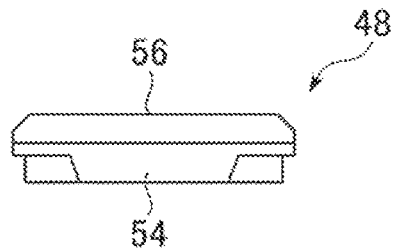
Figure 4D:
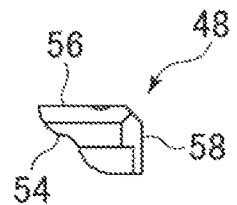

As illustrated in FIG. 2B, the female member 16 includes the female member body 19 and engaging members 48 fixed to the female member body 19. The female member body 19 is formed in a substantially plate shape and includes a coupling hole 50 that opens in a thickness direction and a female-member contact surface 52 formed in one surface thereof. The coupling hole 50 includes a first coupling hole 55 formed on the female-member contact surface 52 side, and a second coupling hole 57 formed on another surface side coaxially with the first coupling hole 55. The second coupling hole 57 has a diameter that is larger than that of the first coupling hole 55. In a part of connection between the first coupling hole 55 and the second coupling hole 57, a plurality of setting portions 59, in the case of the present embodiment, three setting portions 59, are provided at respective positions in the circumferential direction corresponding to positions of the cams 26. Each setting portion 59 is a groove that opens on the other surface side of the female member body 19 and the inner surface side of the coupling hole 50, and includes a ceiling surface 51 formed on the female-member contact surface 52 side and a side surface 53 formed in a radial direction of the coupling hole 50. Each of the ceiling surface 51 and the side surface 53 is fiat. In each of the setting portions 59, an engaging member 48 is set.

As illustrated in FIGS. 3 and 4A to 4D, the engaging member 48 is an elongated member, and a cross-sectional shape perpendicular to a longitudinal direction thereof is formed in a substantially triangular shape by a first dispersing surface 56 and a second dispersing surface 58, which are perpendicular to each other and form a dispersing surface, and an engaging surface 54. Each of the first dispersing surface 56 and the second dispersing surface 58 is flat. In the first dispersing surface 56, a plurality of fastening holes 60 are formed only along the longitudinal direction. As illustrated in the figures, the plurality of fastening holes 60 are arranged only in one line in the longitudinal direction. In the case of the figures, three fastening holes 60 are formed in one line in the longitudinal direction. The engaging surface 54 has a circular arc shape.

Figure 5:
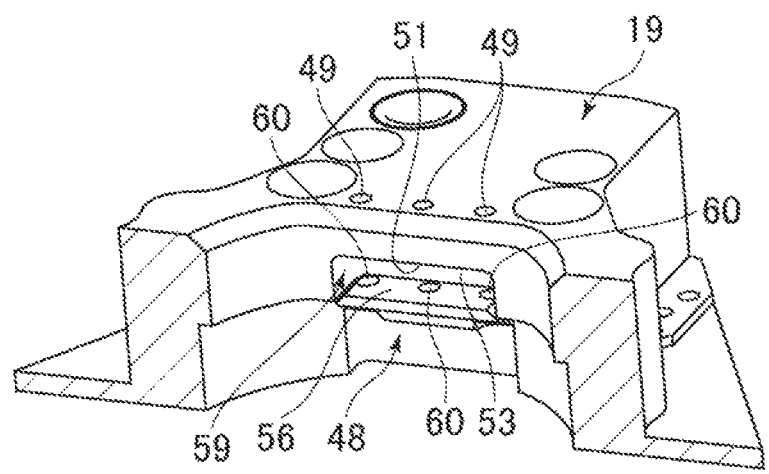
FIG. 5 is a partial perspective diagram illustrating a positional relationship between the engaging member and a female member body according to the present embodiment.
Figure 6:
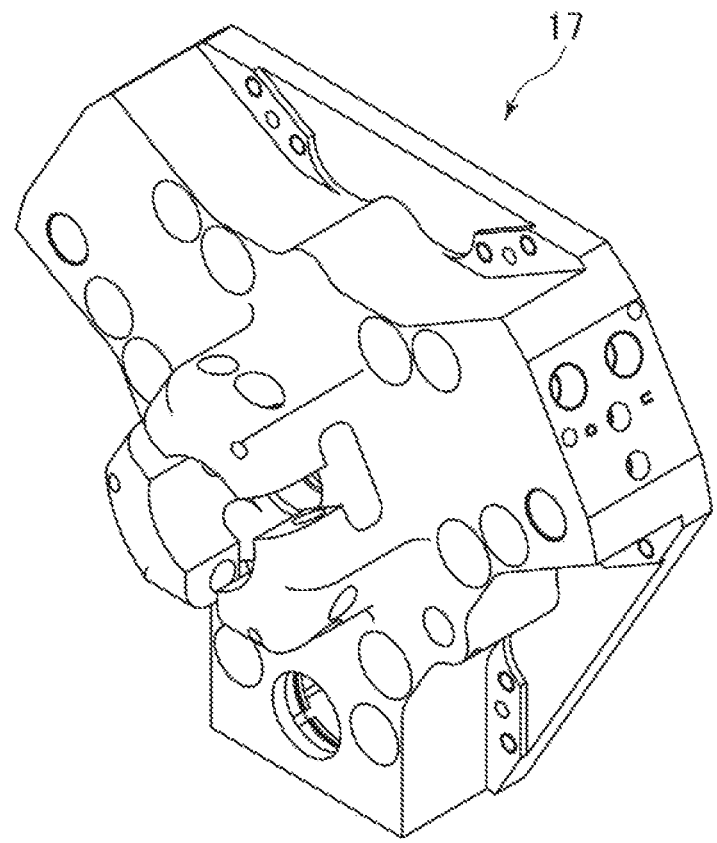
FIG. 6 is a perspective diagram illustrating a configuration of a male member body according to the present embodiment.
Figure 7:
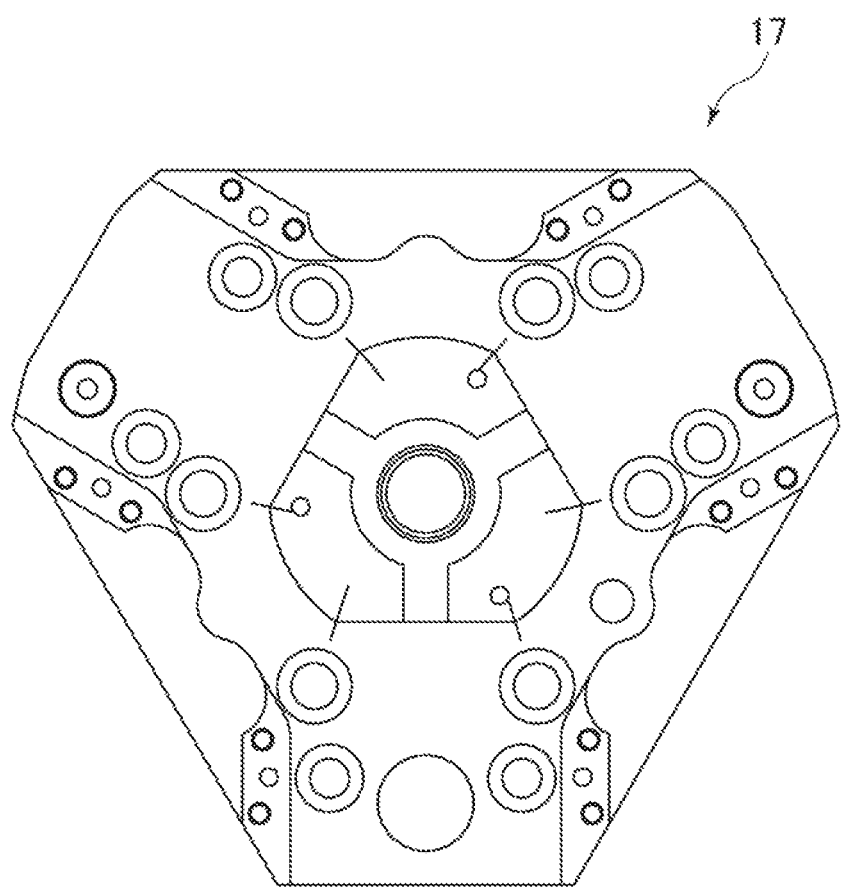
FIG. 7 is a front view illustrating the configuration of the male member body according to the present embodiment.
Figure 8:
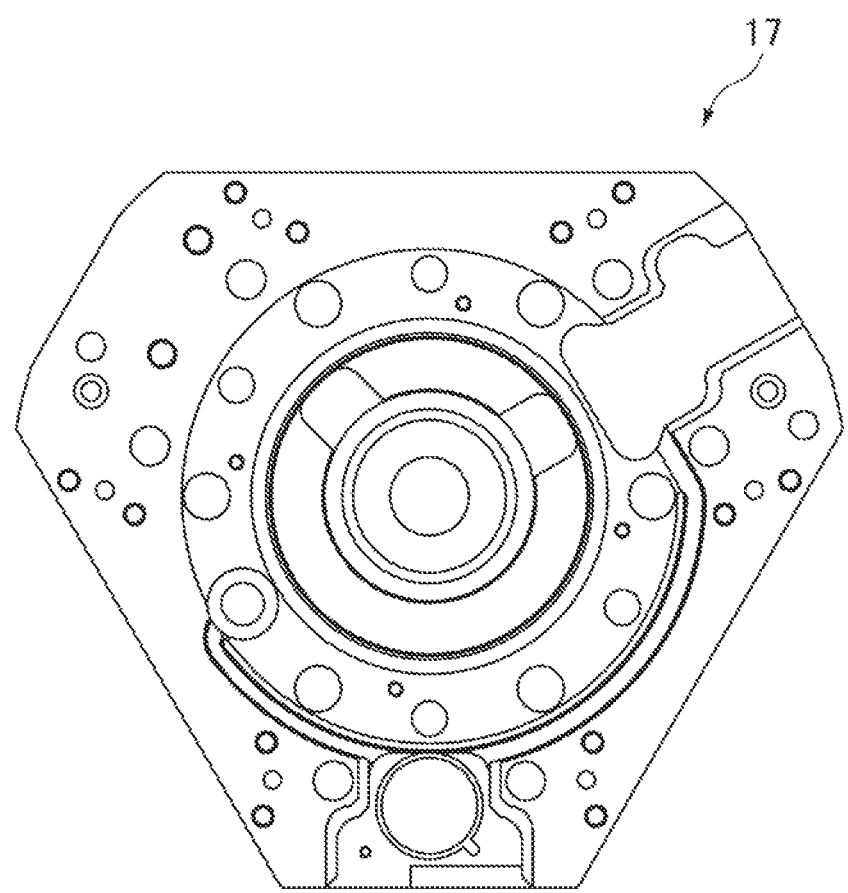
FIG. 8 is a back view illustrating the configuration of the male member body according to the present embodiment.
Figure 9:
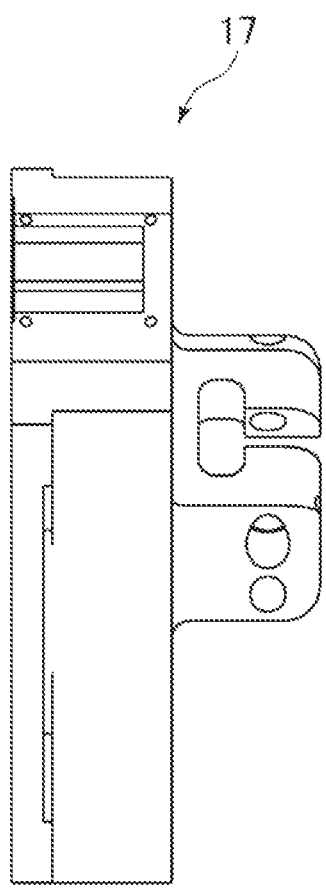
FIG. 9 is a left side view illustrating the configuration of the male member body according, to the present embodiment.
Figure 10:
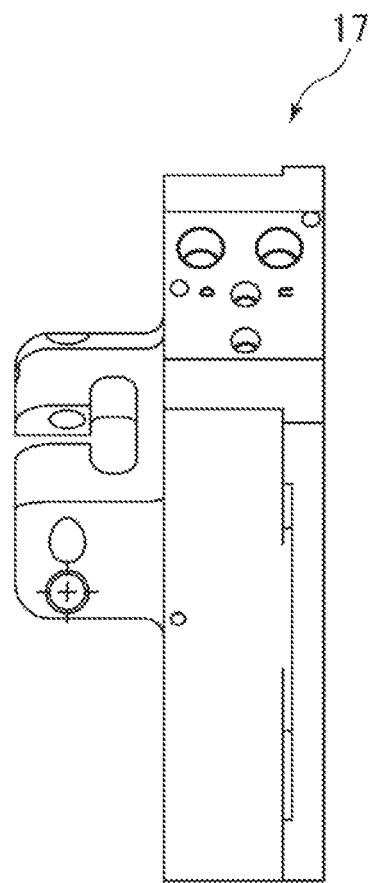
FIG. 10 is a right side view illustrating the configuration of the male member body according to the present embodiment.
Figure 11:
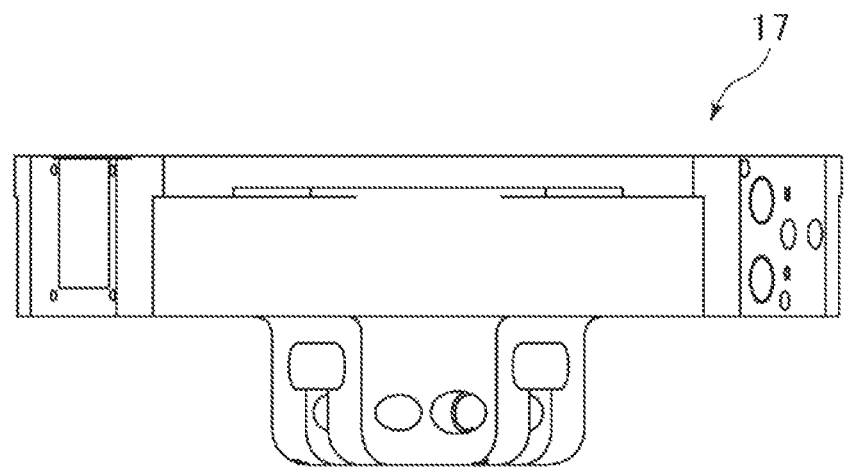
FIG. 11 is a plan view illustrating the configuration of the male member body according to the present embodiment.
Figure 12:
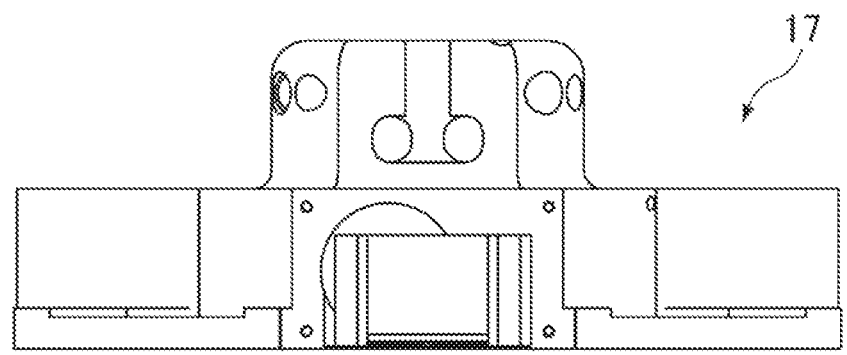
FIG. 12 is a bottom view illustrating the configuration of the male member body according to the present embodiment.
Figure 13:
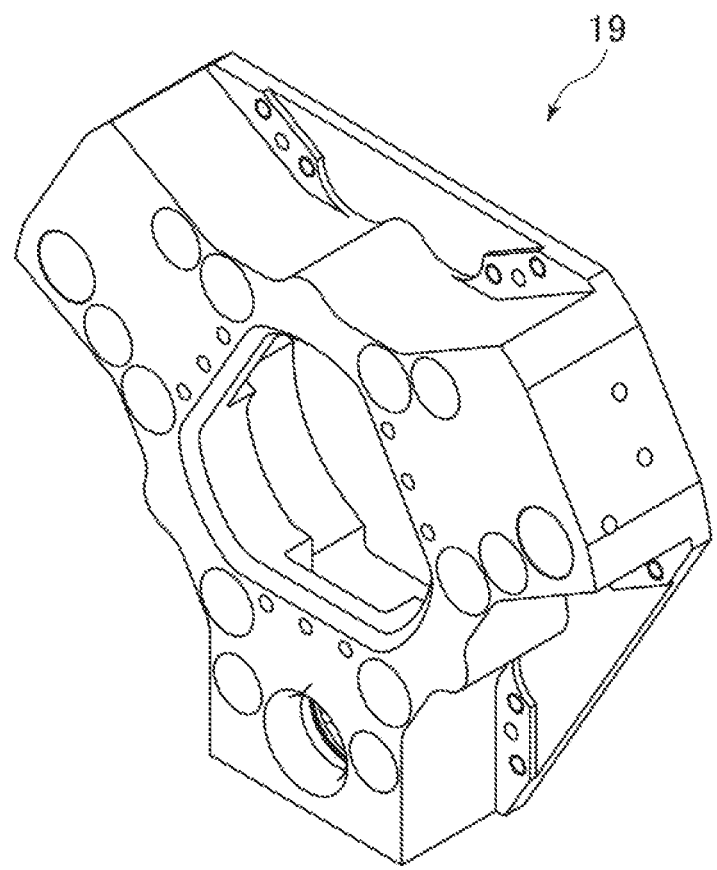
FIG. 13 is a perspective diagram illustrating a configuration of the female member body according to the present embodiment.
Figure 14:
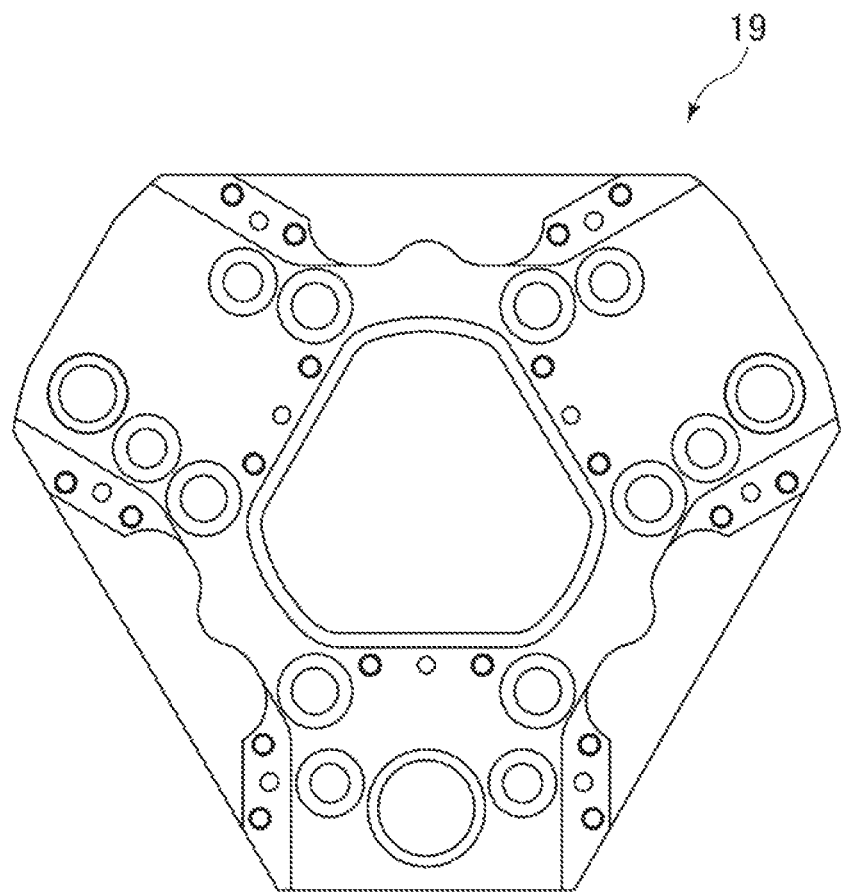
FIG. 14 is a front view illustrating the configuration of the female member body according to the present embodiment.
Figure 15:
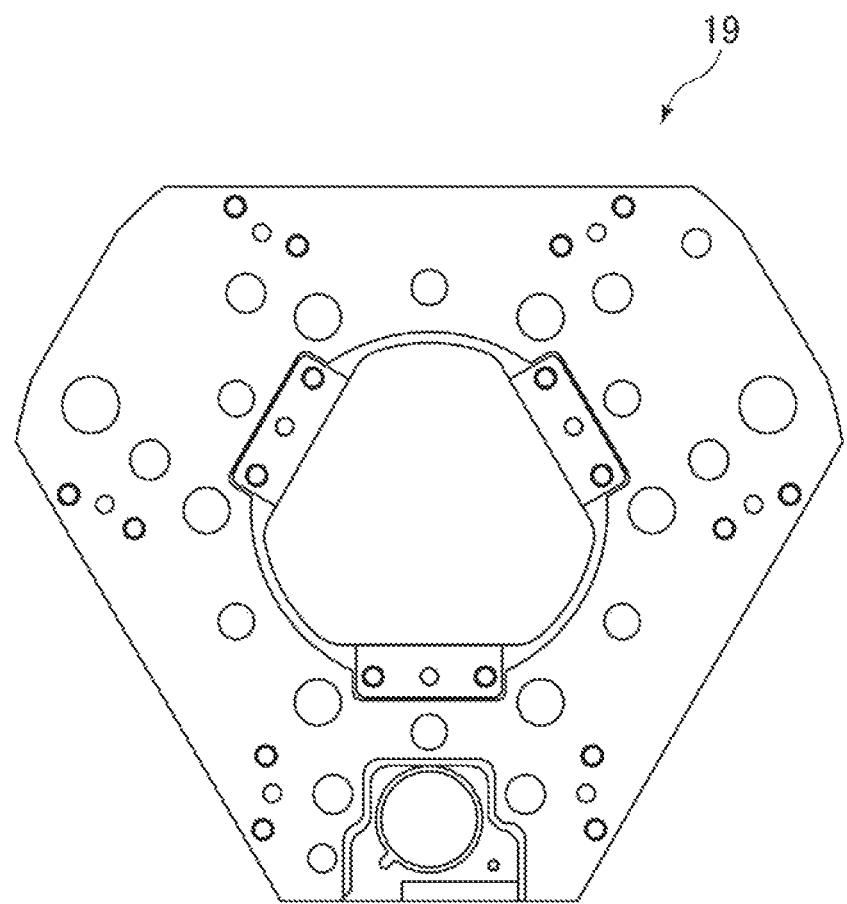
FIG. 15 is a back view illustrating the configuration of the female member body according to the present embodiment.
Figure 16:
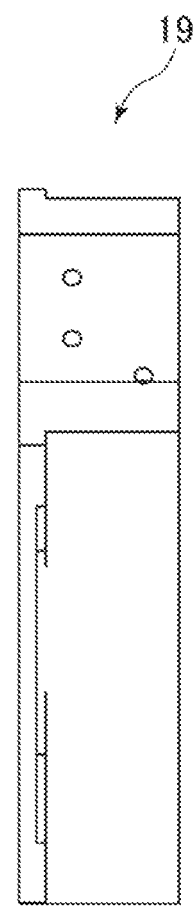
FIG. 16 is a left side view illustrating the configuration of the female member body according to the present embodiment.
Figure 17:
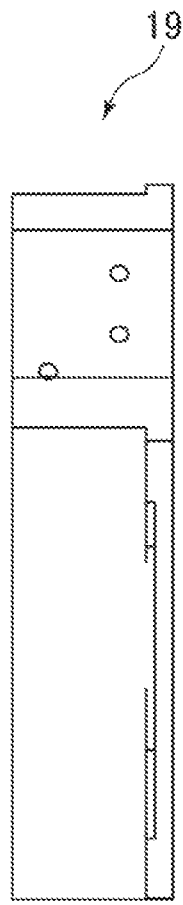
FIG. 17 is a right side view illustrating the configuration of the female member body according to the present embodiment.
Figure 18:
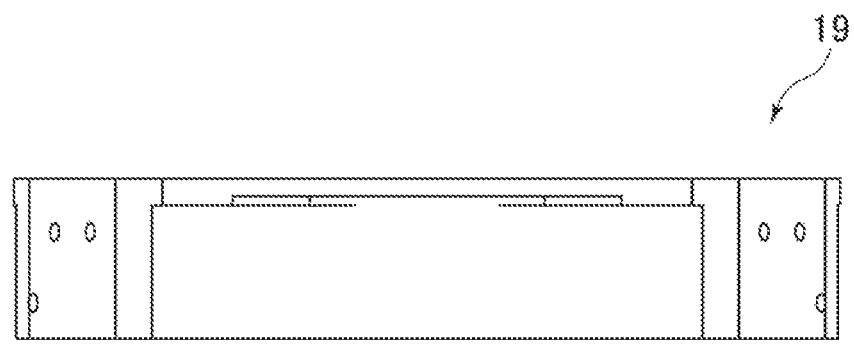
FIG. 18 is a plan view illustrating the configuration of the female member body according to the present embodiment.
Figure 19:
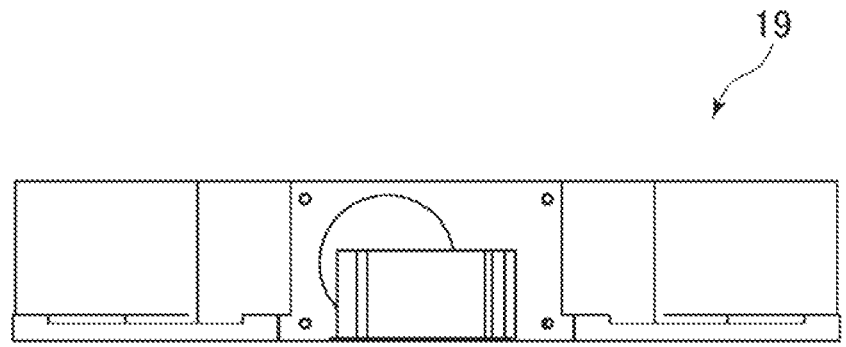
FIG. 19 is a bottom view illustrating the configuration of the female member body according to the present embodiment.

A positional, relationship between the engaging member 48 and the setting portion 59 will be described with reference to FIG. 5. FIG. 5 is a perspective diagram illustrating a state before insertion of an engaging member 48 into a setting portion 59. The engaging member 48 is arranged with the longitudinal direction thereof along a circumference direction of the coupling hole 50 (FIG. 2B), and is inserted in such a manner that the first dispersing surface 56 comes into surface contact with the ceiling surface 51 of the setting portion 59 and the second dispersing surface 58 comes into surface contact with the side surface 53 of the setting portion 59. In the female member body 19, through holes 49 are formed at respective positions in a circumferential direction, the positions corresponding to the fastening holes 60. The engaging members 48 are detachably fixed to the female member body 19 by bolts (not illustrated) inserted via the through holes 49.

Also, FIGS. 6 to 19 illustrate perspective diagrams and six side views of the male member body 17 and the female member body 19.

(2) Operation and Effects

Next, operation of coupling of the male member 12 and the female member 16 will be described. First, the male member 12 and the female member 16 are arranged coaxially and thereby positioned. In this state, a gas, which is a fluid, is supplied from the first port 32 to the one side of the cylinder chamber 30 across the head 40, by the gas supply/exhaust mechanism. Upon pressure on the one side of the head 40 being increased so as to exceed a force of the coil spring 24 by the gas, the cylinder 22 moves to the other side, that is, falls (FIG. 2A). Consequently, the first diameter-increased portion 44 pushes the addition portion 29 of each cam 26 down. Then, each cam 26 rotates around the relevant support shaft 27 in the arrow direction, that is, counterclockwise in FIG. 2A. Consequently, the cams 26 are received in the projection portion 28.

Figure 20:
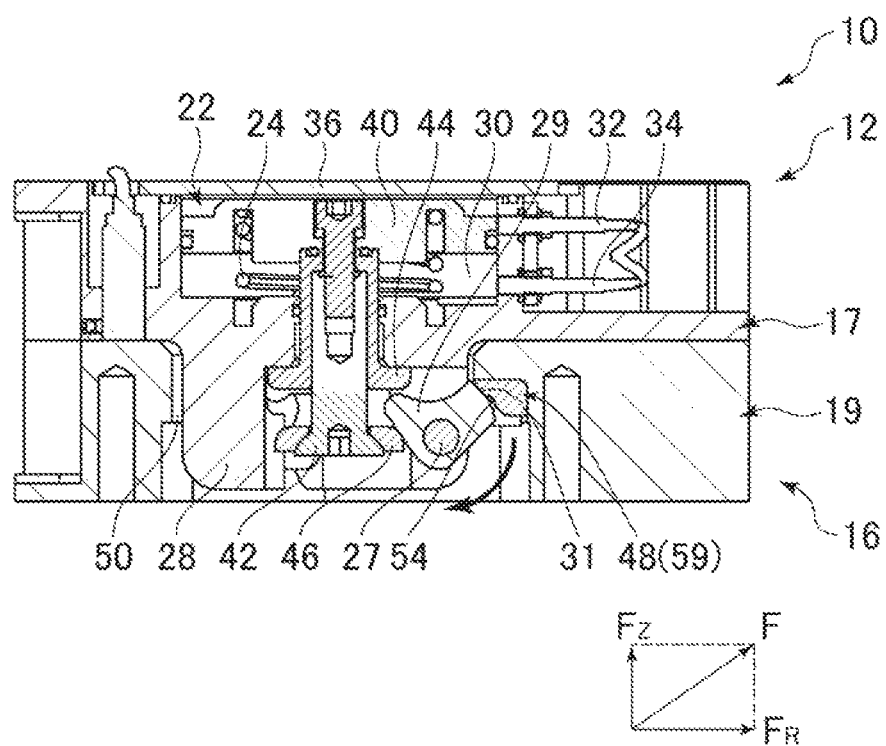
FIG. 20 is a cross-sectional view of the tool changer according to the present embodiment and is a diagram illustrating a state in which a male member and a female member are coupled.

Next, as illustrated in FIG. 20, the projection portion 28 of the male member 12 is inserted to the coupling hole 50 of the female member 16 until the male-member contact surface 38 (FIG. 2A) comes into contact with the female-member contact surface 52 (FIG. 2B). In this state, the gas on the one side of the cylinder chamber 30 across the head 40 is discharged from the first port 32 by the gas supply/exhaust mechanism. Simultaneously, a gas is supplied from the second port 34 to the other side of the cylinder chamber 30 across the head 40. Pressure provided by the gas plus the force of the coil spring 24 causes the cylinder 22 to move to the other surface side, that is, rise in the figure. Consequently, the second diameter-increased portion 46 pushes the addition portion 29 of each cam 26 up. Then, each cam 26 rotates around the relevant support shaft 27 in the arrow direction, that is, clockwise in the figure. The rotation causes each cam 26 to project radially from the projection portion 28, and the relevant acting portion 31 engages with the engaging surface 54 of the corresponding engaging member 48. Consequently, the male member 12 and the female member 16 are coupled.

As a result of the male member 12 and the female member 16 being coupled as described above, a force F is provided on the engaging surface 54 of each engaging member 48 from the corresponding cam 26 through the relevant acting portion 31. Assuming that the force F is divided into an axial component $F_Z$ and a radial component $F_B$, the axial component $F_Z$ acts on the first dispersing surface 56 of the engaging member 48 and the radial component $F_B$ acts on the second dispersing surface 58.

The tool changer 10 according to the present embodiment is configured so that the radial component $F_B$ acting on the second dispersing surface 58 of each engaging member 48 is larger than the axial component $F_Z$ acting on the first dispersing surface 56. Consequently, as opposed to the conventional techniques, no moment is generated in the engaging members 48 in the arrow direction in FIG. 20, enabling simplification of a method of fixing the engaging members 48 to the female member body 19. In other words, in the case of the present embodiment, there is no need to arrange a plurality of bolts for fixing each engaging member 48 in a radial direction of the female member 16. Therefore, each engaging member 48 according to the present embodiment only needs the fastening holes 60 to be arranged in the longitudinal direction, enabling reduction in size in a width direction. Furthermore, since no moment in a direction in which each engaging member 48 corner off from the corresponding setting portion 59 is generated, the engaging member 48 enables use of bolts that are small compared to conventional ones, and in addition, the bolts can be fastened and fixed from the ceiling surface 51 side of the setting portion 59, enabling reduction in size in a height direction. Therefore, the cross-sectional shape perpendicular to the longitudinal direction of each engaging member 48 can be formed in a substantially triangular shape by the engaging surface 54, the first dispersing surface 56 and the second dispersing surface 58, enabling downsizing.

Also, the female member 16 has no need to radially arrange through holes 49 for inserting bolts, and thus can be downsized radially. Therefore, the tool changer 10 can be downsized as a whole.

In order to cause a force that is larger than that acting on the first dispersing surface 56 of each engaging member 48 to act the second dispersing-surface 58 as described above, it is effective to make an angle of rotation of each cam 26 when the cam 26 engages with the corresponding engaging surface 54 larger. Consequently, the radial component $F_B$ can be made to be larger than the axial component $F_Z$, enabling a force that is larger than that acting on the first dispersing surface 56 of each engaging member 48 to act on the second dispersing surface 58.

(3) Alteration

The present invention is not limited to the above-described embodiment, and arbitrary changes are possible within the scope of the spirit of the present invention. In the case of the above-described embodiment, the male member body 17 and the female member body 19 each having a polygonal shape in front view are illustrated; however, the present invention are not limited to the case and a male member body and a female member body each having a round shape in front view can be employed.

Although the above embodiment has been described in terms of the case where three cams 26 are provided on the circumference of the projection portion 28, the present, invention is not limited to the case, and four or more cams 26 may be provided.

Although the above embodiment has been described in terms of the case where a gas is used as a fluid for moving the cylinder 22, the present invention is not limited to this case, and a liquid may be used. Also, the cams 26 may be each driven using a motor.

Although the above embodiment has been described in terms of the case where the first dispersing surface 56 and the second dispersing surface 58 of each engaging member 48, and the ceiling surface 51 and the side surface 53 of each setting portion 59 each are flat, the present invention is not limited to this case. Each of the first dispersing surface 56 and the second dispersing surface 58, and the ceiling surface 51 and the side surface 53 may have a curved shape or a corrugated shape if the curved surface or the corrugated surface enables surface contact.

Although the above embodiment has been described in terms of a case of an industrial robot as an example of an apparatus, an apparatus to which a tool changer is attached is not limited to an industrial robot. For example, the apparatus may be a tool: attached to, e.g., an arm, or a balance arm or a hand crane that facilitate movement of an object grasped by the tool or work at a destination of the movement. Also, although the male member is attached to the arm of the industrial robot on the body side of the apparatus, as the position of the attachment, an arbitrary position in the body of the apparatus may be determined according to, e.g., the configuration of the apparatus and/or the type of the tool.

REFERENCE SIGNS LIST 10 tool changer
12 male member
14 tool
16 female member
17 male member body
19 female member body
26 cam
48 engaging member
54 engaging surface
56 first dispersing surface
58 second dispersing surface
60 fastening hole

The invention claimed is:

1. An engaging member of a tool changer including a male member to be detachably attached to a body side of an apparatus and a female member to be detachably attached to a tool side, the engaging member being detachably attached to a female member body included in the female member, the engaging member comprising:
    an engaging surface that allows a cam provided in the male member to engage therewith; and
    a dispersing surface that transmits a force provided from the cam via the engaging surface, to the female body member, wherein
    the dispersing surface includes a first dispersing surface and a second dispersing surface that are substantially perpendicular to each other, the first dispersing surface is formed in a substantially square shape having a longitudinal direction, wherein a cross-sectional shape perpendicular to the longitudinal direction of the engaging member is formed in a substantially triangular shape by the first dispersing surface, the second dispersing surface and the engaging surface, and
    a plurality of fastening holes arranged only in one line in the longitudinal direction are formed in the first dispersing surface.

2. A female member, comprising:
    the engaging member according to claim 1; and
    the female member body to which the engaging member is detachably attached, wherein
    in the female member body, a plurality of through holes are formed at respective positions corresponding to the plurality of fastening holes, and
    the engaging member is detachably fixed to the female member body by bolts inserted from the female member body via the plurality of through holes.

3. A tool changer comprising the female member according to claim 2.

4. The female member according to claim 2, the female member body further including:
    a coupling hole that opens in a thickness direction and is configured so that a projection portion of the male member to be detachably attached to the body side of the apparatus is inserted therein;
    a female-member contact surface that is formed in one surface thereof and is configured to contact a male-member contact surface of the male member; and
    a setting portion that is a groove that opens on the other surface of the female member body and an inner surface of the coupling hole and is configured so that the engaging member is set therein, the setting portion including:
        a ceiling surface that is configured to contact with the first dispersing surface; and
        a side surface that is formed in a radial direction of the coupling hole and is configured to contact with the second dispersing surface.

5. A tool changer comprising the female member according to claim 4.

* * * * *